Sept. 17, 1968   D. R. MALEY   3,401,551
NONDESTRUCTIVE TESTER
Filed July 26, 1965   2 Sheets-Sheet 1
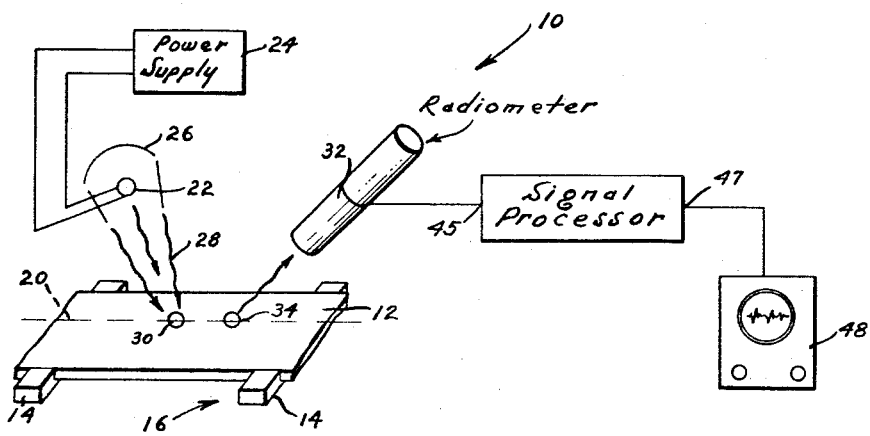
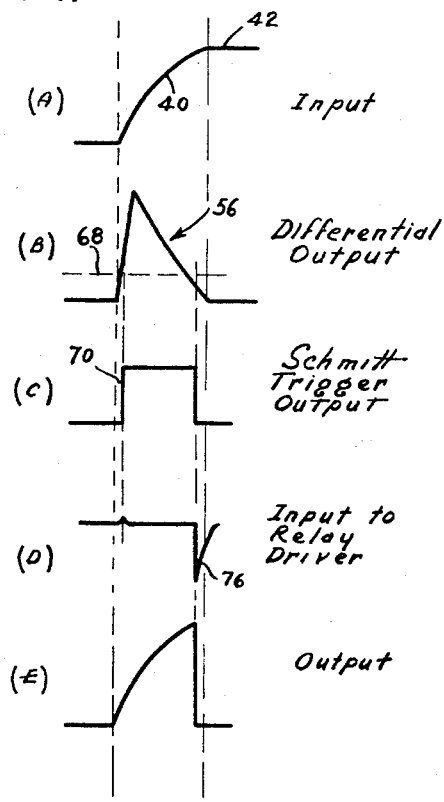
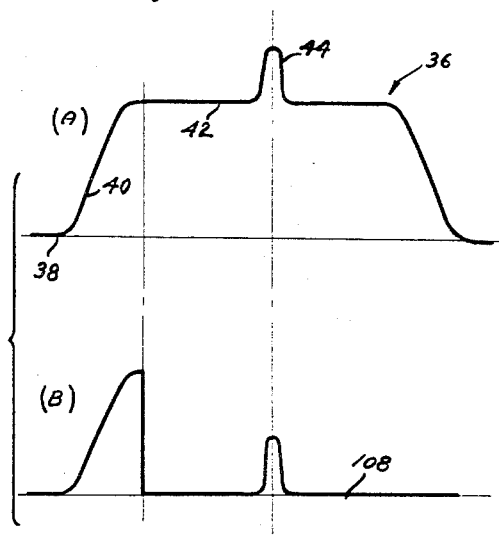
INVENTOR.
Dale R. Maley
By 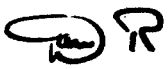
Attorney.

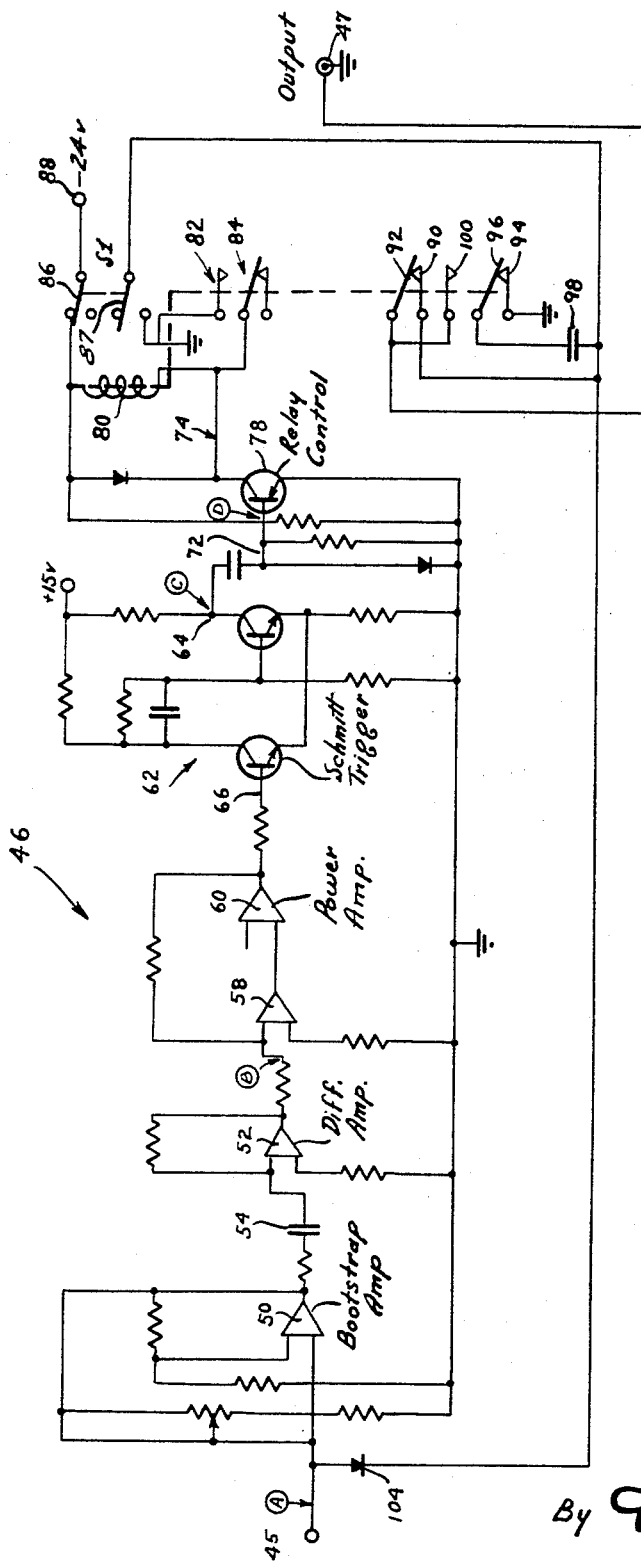

United States Patent Office

3,401,551
Patented Sept. 17, 1968

3,401,551
NONDESTRUCTIVE TESTER
Dale R. Maley, Boulder, Colo., assignor to Automation Industries, Inc., El Segundo, Calif., a corporation of California
Filed July 26, 1965, Ser. No. 474,593
9 Claims. (Cl. 73—15)

ABSTRACT OF THE DISCLOSURE

The present disclosure relates to nondestructively inspecting materials by sensing the infrared radiations eminating from the surface of the material. Means are provided for canceling out the DC portion of a signal corresponding to a steady state temperature whereby only the remaining portion of the signal corresponds to the temperature changes resulting from discontinuities in the material.

---

A wide variety of systems are available for observing and measuring various characteristics of a work-piece, such as its internal dimensions, the presence or absence of hidden defects, etc. Most of these systems are responsive to the way some form of energy interacts with the workpiece. If the workpiece is substantially uniform the interaction will be substantially constant through all portions of the workpiece. However, if there are localized discontinuities in the workpiece, there will be corresponding localized variations in the interaction between the energy and the workpiece whereby the discontinuity can be readily detected.

By way of example, one nondestructive testing system is the so-called IR or infrared system. In this form of tester, the temperature of the workpiece is allowed to vary whereby energy in the form of heat flows therethrough. The rate at which the heat flow occurs is a function of the thermal conductivity of the workpiece. The thermal conductivity is a function of a large number of different factors such as the type of material, the porosity, the grain structure, the bonding between laminations, voids, inclusions, etc. Normally, all of these characteristics are substantially uniform throughout all regions of the workpiece. As a consequence, the amount and/or rate of temperature change will be correspondingly uniform. However, under some circumstances, one or more of these characteristics may vary in a limited region of the workpiece. This, in turn, causes a corresponding localized variation in the amount and/or rate of temperature change. Therefore, by sensing these changes in temperature, the variation in the workpiece can be located.

It has been found that when employing an infrared tester of the foregoing variety, the temperature on the surface of the workpiece remains substantially constant and only infrequently momentarily varies by a small amount. As a consequence, the test signal has a relatively large and constant amplitude with the variations in the workpiece being indicated by relatively small variations therein. As a result, the small variations, which constitute the information in the signal, are sometimes difficult to read and record on such readout devices as oscilloscopes and chart recorders. It has thus been extremely difficult to accurately and reliably detect some types of characteristics. Accordingly, it can be seen that although the foregoing infrared systems have been capable of performing useful tests, they have had numerous disadvantages and limitations which detract from their commercial value.

The present invention provides means for overcoming the foregoing disadvantages and limitations. More particularly, the present invention provides an infrared test system which is capable of accurately and reliably detecting variations in a workpiece. This is accomplished by providing means that scan the surface of the workpiece and sense the temperature thereof together with means for providing a signal that only occurs when there is a variation in the temperature. This is accomplished by providing means capable of sensing test temperature corresponding to homogeneous regions in the workpiece. The signal portion attributable to homogeneous material is then eliminated from the output signal whereby only the temperature changes due to anomalies will be indicated.

In the single embodiment of the present invention disclosed herein, the workpiece is heated by projecting energy onto its surface whereby the temperatures and/or rates of change of temperature of the various incremental areas are a function of the internal characteristics of the workpiece immediately adjacent thereto. A radiometer scans the successive incremental areas and produces a radiation signal that is a function of the temperature of the areas. Storage means sample the radiation signal at the beginning of each scan line and store a signal proportional thereto. The stored signal is then subtracted from the radiation signal occurring during the remainder of the scan line. This leaves a test signal which is independent of the absolute temperature, i.e., it always has a zero base. Since the steady state portion of the signal has been removed, the only portions of the signal remaining are those resulting from variations in the workpiece whereby these variations are reliably and accurately sensed.

These and other features and advantages of the present invention will become readily apparent from the following detailed description of a single embodiment thereof particularly when taken in connection with the accompanying drawings wherein like reference numerals refer to like parts and wherein:

FIGURE 1 is a block diagram of an infrared test system embodying one form of the present invention, FIGURE 2 is a schematic diagram of a circuit employed in one portion of the test system of FIGURE 1, FIGURE 3 is a series of wave forms present in various portions of the circuit of FIGURE 2, FIGURE 4 is a series of wave forms present in various portions of the circuit of FIGURE 2.

Referring to the drawings in more detail, the present invention is particularly adapted to be embodied in a nondestructive test system 10 for inspecting a workpiece for hidden defects, and/or for measuring the various dimensions thereof, etc. For purposes of illustration, the present workpiece 12 is shown as a relatively flat member such as a piece of sheet metal or a panel. However, it should be understood that any type of workpiece may be employed.

A pair of supports 14 are provided for retaining the workpiece 12 in position during a test. Although the workpiece 12 may be maintained stationary throughout a test, in this embodiment a scan mechanism 16 is coupled to the supports 14. This scan mechanism 16 drives the supports 14 whereby the test system 10 will examine the workpiece 12 along a scan line 20. If desired, the mechanism 16 may index the workpiece 12 at the completion of a scan line 20 so that it will be examined along a series of parallel scan lines. By way of example, the present scan mechanism 16 is effective to move the workpiece 16 such that the scan line 20 will extend longitudinally from one end to the other.

In order to produce a flow of heat through the workpiece 12 the temperature of the workpiece is allowed to vary during the test. Although the temperature change can result from any suitable cause, in the present instance, it is accomplished by moving the focus point 30 of a heat source 22 along the scan path 20, allowing each incremental area on the scan path to first heat and then cool as the "hot spot" 30 passes over it. The heater 22 can be the filament of an incandescent lamp or a similar device. The heater 22 is connected to a power supply 24 that will continuously circulate a substantially uniform electrical current through the heater 22 whereby the amount of heat transfer to the workpiece 12 is substantially constant.

Suitable focusing means such as a lens or reflector 26 is provided for concentrating or focusing the heat into a well defined beam 28 whereby a relatively small "hot spot" 30 is formed upon the surface of the workpiece 12. As the scan mechanism 16 moves the workpiece 12, this "hot spot" 30 travels across the workpiece 12 along the scan line 20.

The amount of heat or energy in the beam 28 depends upon the type of material, the scan rate, etc. However, for any given test operation, the amount of energy in the beam 28 will remain substantially constant, and will be of a sufficient magnitude to produce a relatively small temperature rise. The amount of this rise is generally in the region of about 50° F. above ambient. For reasons that will become apparent subsequently the energy in the beam 28 should be primarily in the visible range or in the near visible infrared region. Radiations in the far infrared region should be relatively small or nonexistent. Towards this end, it has been found desirable to provide a suitable filter that blocks the far infrared and passes only visible and near visible infrared.

A portion of the energy incident upon the surface of the workpiece 12 in the region of the "hot spot" 30 causes thermal energy to be transferred into the workpiece 12. A large part of this energy will be conducted into and throughout the workpiece 12 in the form of heat. A portion of the energy remaining at the surface will be re-radiated from the surface in the form of infrared energy.

The intensity and wave length of the reradiated infrared energy is a function of the temperature, etc., of the surface and is normally in the region of about 2 to about 15 microns. This reradiated energy is outside of the wave lengths of the energy in the beam 28. The surface temperature is a function of heat that is conducted into the interior of the workpiece. This, in turn, is a function of a large number of factors such as the type of the material, the amount of temperature differential, the thickness, the presence of inclusions, voids, etc.

If the workpiece 12 is relatively thick, the heat will tend to flow or disperse throughout the entire interior of the workpiece 12 whereby the workpiece 12 will act as a heat sink. As a consequence, little energy will remain near the surface and the temperature on the surface will not rise appreciably. Moreover, after the "hot spot" 30 has moved and the heating has stopped, there is a large amount of the heat stored in the workpiece 12. Since it will take an appreciable time for this energy to flow to the surface, the surface will tend to cool at a relatively slow rate.

In contrast, if the workpiece 12 is relatively thin, its ability to absorb heat will be considerably more limited. As a consequence, the temperature will rise to a considerably higher level. However, due to the relatively small amount of stored energy, the temperature will rapidly return to ambient.

It can thus be appreciated that for a given amount of energy the temperature on the surface and the rate at which it changes will be a function of the thickness of the workpiece 12. If the workpiece 12 is homogeneous and of uniform thickness, the manner in which the temperature changes will be substantially uniform along the entire scan line 20. However, if there is a variation in the thickness and/or there is a void, inclusion, etc. with a corresponding localized variation in the thermal conductivity, there will be a variation in the manner in which the temperature varies. By observing the manner in which the temperatures of the incremental areas along the scan line 20 vary, the characteristics of the workpiece 12, including its thickness, internal integrity, etc., can be determined.

The temperatures of the incremental areas may be measured by any suitable form of pickup means. However, in the present instance, a so-called radiometer 32 is employed to receive infrared energy radiated from the surface and provide an electrical signal corresponding thereto. As indicated before, the temperature rise is on the order of about 50° F., more or less. As a consequence, the infrared energy will have a wave length in the region of about 2 to 15 microns. It may be appreciated that if the radiometer 32 is responsive to this region, it will not be responsive to radiations emanating from the heater 22 as these are in the visible range.

The radiometer 32 is focused to only receive the infrared energy radiated from a small incremental area. The particular incremental area upon which the radiometer 32 is focused will hereinafter be referred to as the "scan spot" 34.

The radiometer 32 is normally mounted in a fixed relation to the heater 22 whereby the "scan spot" 34 is maintained in a fixed relation to the "hot spot" 30. The "scan spot" 34 is disposed on the same scan line 20 as the "hot spot" 30 and a predetermined distance therebehind. Each incremental area on the scan line 20 will first be scanned by the "hot spot" 30. Following this the incremental area will be allowed to cool for a predetermined time interval dependent upon the scan rate and the displacement between the "hot spot" 30 and the "scan spot" 34. Following the cooling interval, the "scan spot" 34 will pass over the incremental area as the radiometer 32 scans along the scan line 20. It will thus be seen that the radiometer 32 will scan a series of successive incremental areas and continuously produce a radiation signal that will be a function of the rate at which the temperatures of the incremental areas change. As previously described this rate of change is a function of the characteristics of the workpiece 12.

Normally, the characteristics of the workpiece 12 are substantially uniform, and will not vary materially from one end of a scan line 20 to the other end. As a consequence, the temperature of the "scan spot" 34 normally remains substantially uniform, and the signal from the radiometer 32 remains correspondingly constant.

A typical signal 36 produced by the radiometer 32 during a scan across the workpiece 12 is illustrated by the wave form in FIGURE 3(A). Since the "scan spot" 34 is displaced behind the "hot spot" 30, when the "hot spot" 30 initially begins to scan along the workpiece 12, the "scan spot" 34 is initially displaced from the workpiece 12. During this interval the temperature is substantially ambient. Therefore, the beginning or initial portion 38 of the radiometer signed 36 is very low. As the scan continues, the "scan spot" 34 moves over the edge and along the scan line 20. During this transient condition, the surface temperature will very rapidly rise toward some elevated level in a region of about 50° F. more or less. This produces a transient portion 40 wherein the signal 36 increases rapidly. As soon as the "scan spot" 34 has moved beyond the marginal position of the workpiece 12 and into the region where the temperature is substantially constant the amplitude of the radiometer signal 36 will remain substantially constant, assuming that the workpiece 12 is homogeneous. During this interval the signal 36 has a plateau portion 42. If there are no discontinuities in the workpiece, the radiometer signal will remain substantially constant until the "scan spot" 34 reaches the transient condition existing adjacent the opposite edge of the workpiece 12.

In the event a localized discontinuity such as a void, a delamination in the surface plating, a lack of bonding, a hole in the back of the workpiece, etc., the ability of the workpiece 12 to dissipate heat is materially altered. As a consequence, the temperature of one or more of the incremental areas adjacent the discontinuity will be materially different from the temperatures of the surrounding areas. For example, the temperature may be higher.

The change, i.e., increase in temperature, will cause a corresponding increase in the amplitude of the signal 36 from the radiometer 32. This increase is represented by the small pulse 44 in the center of the signal 36 in FIGURE 3. The amplitude of this change may be substantial and of sufficient size to be detected. However, the pulse 44 is superimposed upon a plateau 42 of amplitude which may be several times greater than the amplitude of the pluse 44 per se, i.e., the amount of change. It can be appreciated that under these circumstances, it may be very difficult to reliably detect small size discontinuities. Also there may be relatively minor variations in the level of the plateau portion 42 that are relatively large compared to the discontinuity signal 44.

In order to overcome these difficulties, the output of the radiometer 32 may be connected to the input 45 to a suitable signal processor 46 so as to supply the signal 36 of FIGURE 3(A) thereto. The output 47 of the processor 46 may be coupled to suitable indicating means such as, by way of example, an oscilloscope 48. This indicating means responds to the signal from the signal processor 46 and indicates the characteristics of the workpiece 12.

Referring to FIGURE 1 and particularly FIGURE 2, the output of the radiometer 32 is coupled to the input of a so-called "boot strap" amplifier 50. An amplifier of this variety has the output coupled back to the input. This will cause the amplifier 50 to lift itself up by its own "boot straps" in response to a rising signal on its input. This, in effect, provides a very high impedance and virtually eliminates any material loading of the radiometer 32 whereby it is effectively completely isolated from the processing circuit 46. The output of the boot strap amplifier 50 is coupled to the input of a differential amplifier 52, by means of a coupling condenser 54. This amplifier 52 is effective to differentiate an increasing signal and produce a signal having an amplitude that is a function of the rate of change. This amplifier 52 will differentiate the rapidly rising leading edge 40 of the radiation signal 36 and produce a differential signal 56 similar to that in FIGURE 4B. The differential signal 56 is characterized by a very rapidly increasing amplitude as the "scan spot" 34 first strikes the edge of the workpiece 12 and the radiation signal 36 begins to increase. As the "scan spot" 34 progresses past the edge of the workpiece 12 and the radiation signal approaches the plateau level 42, the rate of change will decrease and eventually become zero. During this interval, the amplitude of the differential signal 56 decreases and becomes equal to zero at the time the plateau 42 is established.

The output of the differential amplifier 52 may be coupled to more stages 58 and 60 of amplification. These are effective to amplify the differential signal 56 to a more useful level. One of the stages 60 may be in the form of a power amplifier capable of increasing the amount of power in the signal.

The output of the power booster 60 is coupled to a Schmitt trigger circuit 62 of conventional design. The Schmitt trigger circuit 62 has a first state wherein the output 64 is at ground level and a second condition wherein the output 64 is at a positive level. The circuit 62 is arranged so that when the signal on the input 66 is below a preselected trigger level 68, the circuit 62 will remain in a first state. However, when the signal on the input 66 exceeds the trigger level 68, the circuit 62 instantly switches to the second state. The circuit 62 will only remain in the second state for so long as the input signal exceeds the trigger level 68. As soon as the signal on the input 66 drops below the trigger level 68, the output 64 will return to its original state.

The trigger level 68 of the Schmitt trigger circuit 62 is normally just above the range in which the differential signal 56 fluctuates in the absence of a larger change in the radiation signal. As a consequence, the trigger circuit 62 will normally remain in the first state. However, as soon as the radiometer signal 36 begins to increase, there will be a rapid increase in the amplitude of the differential signal 46 which will carry it above the trigger level 68. The Schmitt trigger circuit 62 will rapidly switch from the first state to the second state whereby the amplitude of the output signal 70 will rapidly rise to a high level. It may be seen that the Schmitt trigger circuit 62 will switch conditions almost simultaneously with the "scan spot" 34 striking the edge of the workpiece 12.

When the radiometer signal 36 approaches its plateau level 42 and its rate of change decreases, the amplitude of the differential signal 56 decreases and approaches zero. Just before reaching zero, the signal 56 will pass through the trigger level 68 and the Schmitt trigger circuit 62 will return to its first state, i.e., the output signal 70 will return to zero. The trigger level 68 is set above any of the normal fluctuations in the differential signal 56 so as to prevent erratic switching of the Schmitt trigger 62. However, it is desirable for the trigger level 68 to be sufficiently low to insure the Schmitt trigger 62 remaining in the second state until the radiation signal 36 is as close as possible to the plateau level 42, i.e., the transient interval has terminated. It will thus be seen that the output signal 70 of the Schmitt trigger circuit 62 is a square wave pulse having a time duration corresponding to the transient condition existing during the initial phase of the scan.

The output 70 of the Schmitt trigger circuit 62 is coupled to a relay control 74 by means of a differentiating network 72. This network 72 is effective to differentiate the leading and trailing edges of the output or square wave 70 from the Schmitt trigger circuit 62. This network 72 will produce a negative going spike 76 (FIGURE 3(D)). This spike 76 is coincident with the trailing edge of square wave 70 from the Schmitt trigger circuit 62 and indicates that the transient condition has terminated. The positive spike obtained upon differentiating the leading edge of the Schmitt trigger output 70 is removed from the input to the relay driver 78 (see FIGURE 3(D)) by the diode 106 at the input of the relay driver 78.

The relay control 74 includes a transistor 78 having its base coupled to the differentiating network 72. The collector is coupled to the coil 80 of a relay 82 so as to control the current flowing therethrough. Normally, the transistor 78 will be an open switch and will not circulate a current through the coil 80. However, when the negative spike 76 occurs, the transistor 78 will become conductive for a sufficient period of time to energize the coil 80 and switch the contacts in the relay from the position shown to the opposite position. The first set of contacts 84 form a holding circuit which will maintain the coil 80 energized until the circuit is broken such as by opening of the switch 86 to the power supply 88. This switch 86 together with switch 87 will normally be momentarily actuated at the completion of each scan line 20 whereby the relay coil 80 will be deenergized and the charge on condenser 98 will be dissipated.

The second set of contacts includes a fixed contact 90 that is connected to the input 45 and a movable contact 92 that is connected to the output 47. The third set of contacts includes a fixed contact 94 connected directly to ground, a movable contact 96 coupled to the input 45 by a large storage capacitor 98 and a fixed contact 100 coupled to the movable contact 92.

When the contacts are positioned as shown, the input is connected directly to the output and the condenser 98 is coupled in parallel thereto. The condenser 98 will thereby accumulate a charge having a potential that is equal to the potential of the input signal 36.

When the contacts are in the opposite position from that shown, the condenser 98 will be connected in series with the input and output. The charge stored on the condenser 98 will have its polarity reversed to the charge of the signal 36 whereby it will be subtracted therefrom.

In order to employ the present system for testing or inspecting a workpiece, the workpiece 12 may first be clamped onto the support 14. The scan mechanism 16 and the heater 22 are then turned "ON." This will cause the heat from the heater 22 to be focused into a beam 28 that forms the "hot spot" 30. Initially, the "hot spot" is on the surface of the workpiece 12 or immediately adjacent one edge thereof. The scan mechanism 16 will commence traveling along a scan line 20 on the workpiece 12. The "scan spot" 34 defined by the focus of the radiometer 32 will simultaneously scan the workpiece 12 a predetermined interval behind the "hot spot" 30. The radiometer 32 will thereby scan a sequence of incremental areas that were previously heated by the heater 22 a predetermined time interval therebefore.

As has been described before, the temperature of an incremental area is a function of the characteristic of the workpiece 12 immediately adjacent thereto. At the edge of the workpiece 12 there are large radiating surfaces, etc., whereby the temperature is relatively low. However, as the distance from the edge increases, the effects of the edge decrease and the temperature rises to some plateau level 42 and remains constant for the rest of the scan line 20, i.e., until the opposite edge is reached.

As the radiometer 32 scans the successive incremental areas in a scan line 20, it produces a signal 36 which corresponds to the temperatures of the incremental areas. The radiometer signal 36 is coupled into the signal processor 46. The signal 36 is coupled through the diode 104 to the condenser 98 which is grounded by the contacts 94 and 96 in the relay 82. The condenser 98 will thereby accumulate a charge having a potential corresponding to the amplitude of the signal and particularly the amplitude during the initial transient portion. Simultaneously, the radiation signal is applied to the "boot strap" amplifier 50 and amplified to a higher magnitude. The amplified signal is then differentiated in the differential amplifier 52 and converted into a signal similar to that in FIGURE 4(B). More particularly, the differential signal 56 has an amplitude corresponding to the rate of change of the radiometer signal 36. The differentiated signal 56 is coupled to the Schmitt trigger circuit 62. The Schmitt trigger circuit 62 will then produce the square wave signal 70 of FIGURE 4(C). This square wave signal 70 has a beginning and ending substantially coincident with the beginning and ending of the transient condition occurring as the radiometer signal 36 rises to the plateau level 42.

The output of the Schmitt trigger circuit 62 is differentiated to produce a negative spike 76 which is substantially coincident with the termination of the transient condition. This negative spike 76 is then effective to actuate the relay control 74 and cause all of the movable contacts 84, 92 and 96 to move to the second position. The closing of contacts 84 will form a holding circuit whereby coil 80 is maintained energized and contacts 84, 92 and 96 are kept in the second position. This condition persists until the end of a scan when switch 86 and 87 release the coil 80 and discharge the condenser 98.

During the initial portion of the scan the condenser 98 has been connected directly to the radiometer 32. Because of the very short time constant in the charging circuit the condenser 98 has a charge corresponding to the amplitude of the radiometer signal 36 at the conclusion of the transient period. When the relay 82 moves the contacts 92 and 96, the condenser 98 will be connected in series with the output. The charge on the condenser 98 will be opposed to the polarity of the input signal. As a result, the voltage on the condenser 98 will be substracted from the radiometer signal 36.

Thus, irrespective of the amplitude of the plateau level 42 of the radiation signal 36 the amplitude of the signal on the output will immediately fall to zero. This will cause the signal on the output to correspond to the original level 108 in FIGURE 3(B). Normally, the temperature will remain substantially constant through the entire scan line 20 and the output signal 108 will remain at zero.

In the event a discontinuity is present in the workpiece 12, the temperature of one or more incremental areas will be different and there will be a change in the radiation signal 36. For example, there may be a pulse 44 in the center of the plateau portion 42. When the potential on the condenser 98 is substracted from the radiation signal 36 this pulse 44 will still remain. Since the output signal 108 is now referenced down to a zero level, even minor variations in the temperatures will be readily apparent. As a consequence, a reliable and accurate display can be provided on the output means 48.

While only a single embodiment of the present invention has been disclosed herein, it will be readily apparent to persons skilled in the art that numerous changes and modifications may be made thereto without departing from the scope of the invention. Accordingly, the foregoing disclosure and description thereof are for illustrative purposes only and do not in any way limit the invention which is defined only by the claims which follow.

I claim:

1. A nondestructive tester for detecting a characteristic of a workpiece, said tester including the combination of:
    a heat transfer means for varying the temperature of the workpiece,
    infrared pickup means for sensing the temperature of the workpiece and producing a temperature signal that is a function of the temperature of the surface of the workpiece,
    scan means coupled to the pickup means for causing the pickup means to scan the workpiece along a scan line whereby the temperature signal corresponds to the temperature of the workpiece along the scan line,
    storage means coupled to the pickup means and effective to store a reference signal proportional to the temperature signal,
    differentiating means coupled to the pickup means and responsive to the rate of change of the temperature signal during the initial portion of each scan line to produce a differential signal,
    Schmitt trigger means coupled to the differentiating means and effective to change from a first state to a second state when the amplitude of the differential signal rises above a predetermined amount and change back to the first state when the amplitude decreases below said amount, and
    signal means coupled to the storage means and to the Schmitt trigger means, said signal means being effective to subtract the signal in the storage means from the temperature signal during the scan interval after the Schmitt trigger means returns to the first state to produce an output signal.

2. A nondestructive tester for detecting a characteristic of a workpiece, said tester including the combination of:
    pickup means for sensing the temperature of an incremental area on the surface of the workpiece and producing a temperature signal,
    scan means coupled to the pickup means for causing the pickup means to scan the workpiece along a scan line whereby the temperature signal has a time varying amplitude, the instantaneous amplitudes of said signal corresponding to the temperatures of the incremental areas on the scan line,
    storage means for storing a reference signal corresponding to the instantaneous amplitude of the temperature signal, and
    gating means responsive to the initiation of a scan by said pickup means to couple the storage means to the pickup means during the initial portion of each scan to provide a reference signal proportional to the initial temperature of the workpiece at the beginning to each scan line, and output means effective to couple the storage means to the pickup means during the remainder of the scan, said output means being effective to subtract the reference signal from the time varying temperature signal to provide an output which is a function of the variations of the temperature on said scan line.

3. A nondestructive tester for detecting a characteristic of a workpiece, said tester including the combination of:
heat transfer means for being thermally coupled to the workpiece for varying the temperature thereof,
pickup means for sensing the temperature of the workpiece and producing a temperature signal that is a function of the temperature,
scan means coupled to the pickup means for causing the pickup means to scan the workpiece along a scan line whereby the instantaneous amplitude of the signal corresponds to the temperature of the surface of the workpiece along the scan line,
storage means for storing a reference signal,
gating means including a differentiator responsive to the rate of change of the temperature signal, said gating means being effective to couple the storage means in parallel to the pickup means when the temperature signal is changing whereby said reference signal is a function of the temperature of said surface, said gating means being effective to couple the storage means in opposed series with the storage means when the temperature signal is not changing to provide a difference signal, and
output means coupled to said gating means and responsive to the difference signal.

4. A nondestructive tester for detecting a characteristic of a workpiece, said tester including the combination of:
pickup means for sensing the temperature of the workpiece and producing a temperature signal that is a function of the temperature,
scan means coupled to the pickup means for causing the pickup means to scan the workpiece along a scan line whereby the instaneous amplitude of the temperature signal corresponds to the temperatures of the surface of the workpiece along the scan line,
an oscilloscope coupled to the scan means and effective to be deflected in a first direction in synchronism with the pickup means,
storage means for storing a reference signal,
a differentiator coupled to the pickup means, said differentiator being responsive to the rate of change of the temperature signal and effective to couple the storage means in parallel to the pickup means when the temperature signal is changing to produce a reference signal that is a function of the temperature of the surface, said differentiator being effective to connect the pickup means and storage means in opposed series when the temperature signal is not changing to provide a difference signal, and
means coupling said oscilloscope to said pickup and storage means whereby the oscilloscope is deflected in a second direction in response to the difference signal.

5. A nondestructive tester for detecting a characteristic of a workpiece, said tester including the combination of:
pickup means for sensing the temperature of an incremental area on the surface of the workpiece and producing a temperature signal that is a function thereof,
scan means coupled to the pickup means for causing the pickup means to scan the workpiece along a scan line whereby the instantaneous amplitude of the temperature signal corresponds to the temperatures of the incremental areas on the surface of the workpiece along the scan line,
storage means coupled to the pickup means for storing a reference signal that is a function of the temperature signal,
gating means coupled to the storage means and responsive to the initiation of a scan, said gating means being effective to couple the storage means in parallel to the pickup means during the initial portion of each scan whereby the reference signal is a function of the initial temperature at the beginning of a scan, said gating means being effective to couple the storage means in opposed series with the pickup means during the remainder of each scan whereby the reference signal is subtracted from the temperature signal to produce an output signal, and
output means responsive to the output signal.

6. A nondestructive tester for detecting a characteristic of a workpiece, said tester including the combination of:
pickup means for sensing the temperature of an incremental area on the surface of the workpiece and producing a temperature signal that is a function thereof,
scan means coupled to the pickup means for causing the pickup means to scan the workpiece along a scan line whereby the instantaneous amplitude of the temperature signal corresponds to the workpiece along the scan line.
storage means coupled to the pickup means for storing a reference signal that is a function of the temperature signal, and
gating means coupled to both the pickup means and the storage means and responsive to the pickup means to couple the storage means to the pickup means during the initial portion of each scan to store a signal that is a function of the initial temperature at the beginning of the scan and to couple the storage means in opposed series with the pickup means to provide a difference signal during the remainder of the scan, and
an oscilloscope coupled to the pickup means and to the storage means, said oscilloscope being responsive to the difference signal.

7. A nondestructive tester for detecting a characteristic of a workpiece, said tester including the combination of:
heat transfer means for being thermally coupled to the workpiece for varying the temperature thereof,
an infrared pickup means for sensing the temperature of the workpiece and producing a time varying temperature signal, the instantaneous amplitude of said temperature signal corresponding to the temperatures of the incremental areas on the surface of the workpiece,
signal storage means coupled to the pickup means and responsive to the rate of change of the temperature signal, said signal storage means being effective to store a reference signal proportional to the temperature signal when the rate of change of the temperature signal is less than a predetermined amount, and
output means coupled to the pickup means and to the signal storage means to subtract the reference signal from the temperature signal to provide a difference signal.

8. A nondestructive tester for detecting a characteristic of a workpiece, said tester including the combination of:
an infrared pickup means for sensing the temperature of the workpiece and producing a temperature signal that is a function thereof,
scan means coupled to the pickup means for causing the pickup means to scan the workpiece along a series of scan lines whereby the temperature signal rapidly rises at the beginning of each scan to an amplitude corresponding to the temperature of the workpiece at the beginning of the scan line,
differentiating means coupled to the pickup means and responsive to the rate of change of the temperature signal during the initial portion of each scan, storage means coupled to the differentiating means and effective to store a reference signal proportional to the temperature signal at the beginning of each scan when the rate of change is less than a predetermined amount, and output means coupled to the pickup means and to the storage means to subtract the reference signal from the temperature signal during the remainder of the scan interval to provide a difference signal.

9. A nondestructive tester for detecting a characteristic of a workpiece, said tester including the combination of:

an infrared pickup means for sensing the temperature of the workpiece and producing a temperature signal that is a function thereof, scan means coupled to the pickup means for causing the pickup means to scan the workpiece along a series of scan lines whereby the temperature signal rapidly rises at the beginning of each scan to an amplitude corresponding to the temperature of the workpiece at the beginning of the scan line, differentiating means coupled to the pickup means and responsive to the rate of change of the temperature signal during the initial portion of each scan, storage means coupled to the differentiating means and effective to store a reference signal proportional to the temperature signal at the beginning of each scan when the rate of change is less than a predetermined amount, means coupled to the pickup means and to the storage means to subtract the reference signal from the temperature signal during the remainder of the scan interval to provide a difference signal, and an oscilloscope coupled to the scan means and effective to be deflected in a first direction in synchronism with the pickup means and to be deflected in a second direction in response to the difference signal.

References Cited

UNITED STATES PATENTS

| | | | |
|---|---|---|---|
| 3,020,745 | 2/1962 | Sielick | 73—15 |
| 3,206,603 | 9/1965 | Mauro | 250—83.3 |
| 3,210,546 | 10/1965 | Perron | 250—83.3 |
| 3,222,917 | 12/1965 | Roth | 73—15 |

JAMES J. GILL, *Primary Examiner.*

EDDIE E. SCOTT, *Assistant Examiner.*